(12) United States Patent
Interdonato et al.

(10) Patent No.: US 11,329,699 B2
(45) Date of Patent: May 10, 2022

(54) DISTURBANCE MITIGATION

(71) Applicant: Telefonaktiebolaget LM Ericsson (publ), Stockholm (SE)

(72) Inventors: Giovanni Interdonato, Linköping (SE); Pål Frenger, Linköping (SE); Emil Björnson, Linköping (SE); Marcus Karlsson, Linköping (SE); Erik Larsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 111 days.

(21) Appl. No.: 16/302,979

(22) PCT Filed: Oct. 16, 2018

(86) PCT No.: PCT/EP2018/078198
§ 371 (c)(1),
(2) Date: Nov. 19, 2018

(87) PCT Pub. No.: WO2020/078537
PCT Pub. Date: Apr. 23, 2020

(65) Prior Publication Data
US 2020/0119772 A1  Apr. 16, 2020

(51) Int. Cl.
*H04B 7/024* (2017.01)
*H04B 7/0452* (2017.01)
(Continued)

(52) U.S. Cl.
CPC ........... *H04B 7/024* (2013.01); *H04B 7/0452* (2013.01); *H04B 7/0456* (2013.01); *H04W 88/085* (2013.01)

(58) Field of Classification Search
CPC .... H04B 7/024; H04B 7/0452; H04B 7/0456; H04W 88/085
See application file for complete search history.

(56) References Cited

U.S. PATENT DOCUMENTS 6,054,960 A * 4/2000 Tolson ............... H01Q 1/244
343/702
8,203,483 B2  6/2012 Richards
(Continued)

FOREIGN PATENT DOCUMENTS

CN  108418614 A  8/2018
EP  0667068 A1  8/1995
(Continued)

OTHER PUBLICATIONS

Narevsky, Nathan, et al., "eWallpaper Burst-Mode Serial Link", BWRC Summer Retreat, May 18-20, 2014, 1-1.
(Continued)

*Primary Examiner* — Christine Ng
(74) *Attorney, Agent, or Firm* — Murphy, Bilak & Homiller, PLLC

(57) ABSTRACT

A disturbance mitigation method of a communication element for a distributed antenna system is disclosed. The communication element is associated with two or more antenna elements of the distributed antenna system.

The method comprises acquiring channel condition information associated with at least two of a plurality of wireless communication devices served by the communication element, and partitioning the plurality of wireless communication devices into at least two groups based on the acquired channel condition information.

The method also comprises, for each of the groups, determining respective pre-coding weights based on the acquired channel condition information, wherein the respective pre-coding weights of different groups are determined according to different disturbance mitigation approaches.

Furthermore, the method comprises transmitting a signal comprising respective symbols intended for corresponding ones of the plurality of wireless communication devices, wherein the symbols intended for wireless communication
(Continued)

devices of each group are pre-coded using the determined respective pre-coding weights of the group, and wherein the pre-coded symbols of at least two of the groups are superpositioned to form the signal.

Corresponding method of a wireless communication device is also disclosed, as well as corresponding apparatuses, communication element, distributed antenna system, wireless communication device and computer program product.

26 Claims, 5 Drawing Sheets

(51) Int. Cl.
*H04B 7/0456* (2017.01)
*H04W 88/08* (2009.01)

(56) References Cited

U.S. PATENT DOCUMENTS

| | | | |
|---|---|---|---|
| 8,344,949 B2 | 1/2013 | Moshfeghi | |
| 10,231,130 B2* | 3/2019 | Sunay | H04W 16/10 |
| 2001/0045915 A1 | 11/2001 | Moren | |
| 2006/0209670 A1* | 9/2006 | Gorokhov | H04L 5/0062 |
| | | | 370/208 |
| 2008/0204330 A1 | 8/2008 | Hsiao et al. | |
| 2008/0318614 A1* | 12/2008 | Iizuka | H04W 52/325 |
| | | | 455/522 |
| 2009/0122782 A1 | 5/2009 | Horn et al. | |
| 2009/0147768 A1 | 6/2009 | Ji et al. | |
| 2010/0238917 A1 | 9/2010 | Silverman et al. | |
| 2012/0120874 A1 | 5/2012 | McLaughlin et al. | |
| 2012/0315938 A1* | 12/2012 | Van Nee | H04B 7/0434 |
| | | | 455/507 |
| 2013/0285879 A1 | 10/2013 | Wheeler | |
| 2014/0029689 A1* | 1/2014 | Liu | H04B 7/063 |
| | | | 375/267 |
| 2014/0211779 A1 | 7/2014 | Caire et al. | |
| 2014/0362840 A1 | 12/2014 | Wong et al. | |
| 2015/0003261 A1* | 1/2015 | Silverman | H04B 7/0452 |
| | | | 370/252 |
| 2015/0162751 A1 | 6/2015 | Leabman et al. | |
| 2015/0372744 A1 | 12/2015 | Lehtinen | |
| 2016/0277160 A1* | 9/2016 | Lim | H04W 52/46 |
| 2017/0195109 A1 | 7/2017 | Perez-Cruz et al. | |
| 2017/0195140 A1* | 7/2017 | Yi | H04L 5/0073 |
| 2017/0279515 A1* | 9/2017 | Wu | H04B 7/0456 |
| 2017/0295550 A1 | 10/2017 | Amizur et al. | |
| 2018/0152226 A1 | 5/2018 | Li et al. | |
| 2019/0260459 A1* | 8/2019 | Jeon | H04B 7/0617 |
| 2019/0261202 A1* | 8/2019 | Tang | H04B 7/0617 |
| 2019/0363763 A1 | 11/2019 | Frenger et al. | |

FOREIGN PATENT DOCUMENTS

| | | |
|---|---|---|
| EP | 0830754 A1 | 3/1998 |
| EP | 2515374 A2 | 10/2012 |
| EP | 2629363 A1 | 8/2013 |
| EP | 2999155 A1 | 3/2016 |
| WO | 9506365 A1 | 3/1995 |
| WO | 9641430 A1 | 12/1996 |
| WO | 2016115546 A1 | 7/2016 |
| WO | 2018103897 A1 | 6/2018 |
| WO | 2019101290 A1 | 5/2019 |

OTHER PUBLICATIONS

Puglielli, Antonio, et al., "Design of Energy- and Cost-Efficient Massive MIMO Arrays", Proceedings of the IEEE, vol. 104, No. 3, Mar. 2016, 1-21.

Preuss, Robert D., et al., "Two-Way Synchronization for Coordinated Multicell Retrodirective Downlink Beamforming", IEEE Transactions on Signal Processing, vol. 59, No. 11, Nov. 2011, pp. 1-13.

Zhang, Yuxian, et al., "Measurement and Evaluations of Coherent Joint Transmission for 5G Networks", 2017 IEEE Vehicular Technology Conference (VTC Spring), Jun. 4, 2017, pp. 1-5.

* cited by examiner

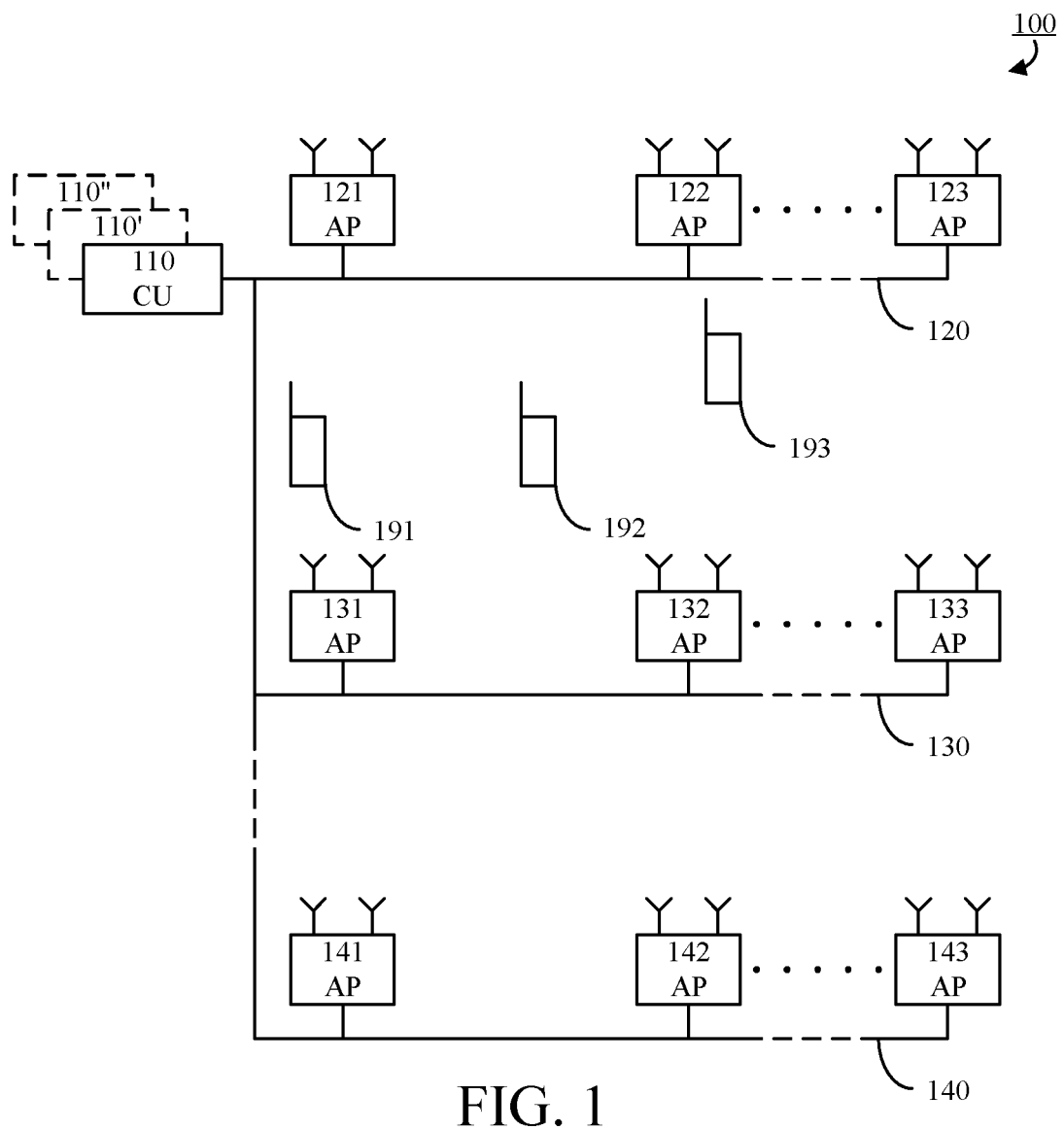
FIG. 1
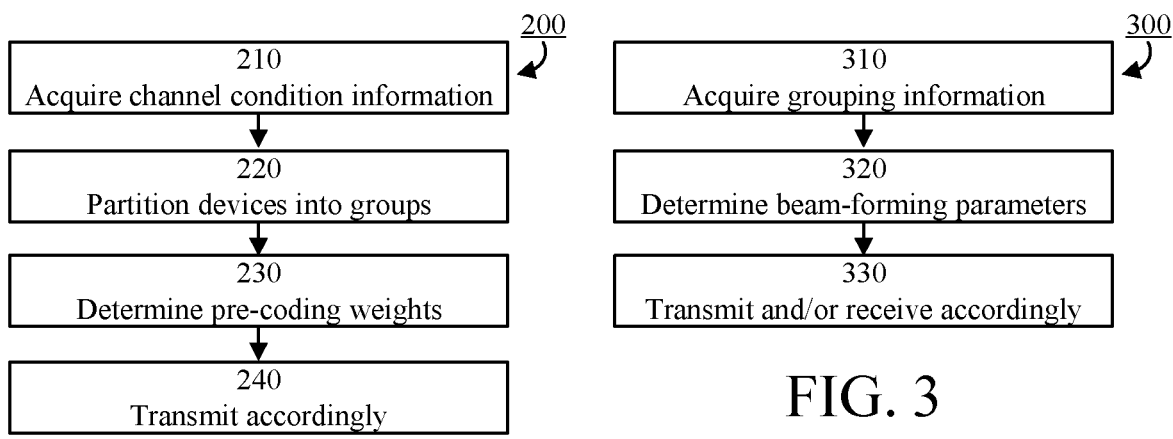
FIG. 2
FIG. 3

DISTURBANCE MITIGATION

TECHNICAL FIELD

The present disclosure relates generally to the field of wireless communication. More particularly, it relates to disturbance mitigation in a wireless communication system.

BACKGROUND

A conventional cellular network typically comprises a set of base stations equipped with an array of co-located antenna elements, each forming one or multiple antenna ports. On the other hand, fully distributed communication networks (distributed antenna systems) may be seen as cell-free systems.

WO 2018/103897 A1 describes various implementations of a distributed antenna system. For example, an antenna arrangement is described, which comprises a body comprising a plurality of antenna devices and having a flexible structure and an elongated shape.

The antenna devices may be referred to as communication elements, each typically comprising one or more antenna elements. The communication elements may act as access points (APs) or base stations (BSs) with a subset of functionalities compared to conventional APs of BSs. The receive processing and the transmit processing of each antenna device is performed by the communication elements, i.e., in the direct vicinity of the antenna element. Since the total number of distributed antenna devices is typically large (e.g. several hundred) the radio frequency transmit power of each antenna element can typically be very low.

The antenna arrangement may be referred to as a "radio stripe", and the communication elements may, for example, be circuit mounted chips inside a protective casing of, e.g., a cable, a stripe (such as a light emitting diode—LED—stripe), or another elongated shape. The radio stripe may, for example, comprise tape or adhesive glue. Other examples are described in WO 2018/103897 A1.

Radio stripes may, for example, be suitable to provide a distributed antenna system deployment. Such distributed antenna system deployments may be used to provide good wireless communicator coverage in, e.g., factory buildings, arenas, malls, etc. Typically, distributed antenna system deployments employing radio stripes may be suitable for providing improved in-door coverage.

Disturbance mitigation in a distributed antenna system may be based on a distributed processing principle where each communications element performs disturbance mitigation locally. Alternatively, disturbance mitigation in a distributed antenna system may be based on a central processing principle where a central coordination apparatus performs global disturbance mitigation.

One disadvantage of the distributed processing principle is that the communications elements may only be capable to perform advanced disturbance mitigation for a number of wireless communications devices that does not exceed the number of antenna elements of the communications device; which number is typically small. Furthermore, even if the number of antenna elements of the communications device was reasonable high, the communications elements may not have sufficient processing capacity to perform advanced disturbance mitigation anyway. Hence, the distributed processing principle may impose a limitation such that only less advanced disturbance mitigation can be applied.

One disadvantage of the central processing principle is that additional signaling is required; from the communications elements to the central coordination apparatus (e.g., channel condition information) and from the central coordination apparatus to the communications elements (e.g., pre-coding weights for disturbance mitigation). Another disadvantage of the central processing principle is that it inherently introduces a time delay between the occasion when the channel condition information is acquired at the communication element and the occasion when a disturbance mitigation derived therefrom can be applied. The latter may render the disturbance mitigation less accurate.

Therefore, there is a need for alternative approaches to disturbance mitigation for distributed antenna systems.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

According to a first aspect, this is achieved by a disturbance mitigation method of a communication element for a distributed antenna system, wherein the communication element is associated with two or more antenna elements of the distributed antenna system.

The method comprises acquiring channel condition information associated with at least two of a plurality of wireless communication devices served by the communication element, and partitioning the plurality of wireless communication devices into at least two groups based on the acquired channel condition information.

The method also comprises, for each of the groups, determining respective pre-coding weights based on the acquired channel condition information, wherein the respective pre-coding weights of different groups are determined according to different disturbance mitigation approaches.

Furthermore, the method comprises transmitting a signal comprising respective symbols intended for corresponding ones of the plurality of wireless communication devices, wherein the symbols intended for wireless communication devices of each group are pre-coded using the determined respective pre-coding weights of the group, and wherein the pre-coded symbols of at least two of the groups are superpositioned to form the signal.

In some embodiments (wherein there is a respective channel between each of the at least two wireless communication devices and each of the two or more antenna elements), acquiring channel condition information comprises receiving uplink pilot signals transmitted by the at least two wireless communication devices, and determining, for each of the respective channels, a channel estimate based on measurements performed on the uplink pilot signals.

In some embodiments (wherein each of the at least two wireless communication devices belong to a set of wireless communication devices assigned a same uplink pilot signal, and wherein there is a composite channel between each set of wireless communication devices and each of the two or more antenna elements), acquiring channel condition information comprises receiving uplink pilot signals transmitted by the at least two wireless communication devices, and determining, for each of the composite channels, a channel estimate based on measurements performed on the uplink pilot signals.

In some embodiments, partitioning the plurality of wireless communication devices into at least two groups comprises partitioning wireless communication devices assigned the same uplink pilot signal to a same group.

In some embodiments, partitioning the plurality of wireless communication devices into at least two groups comprises partitioning a first wireless communication device to a first group when an associated signal strength of the first wireless communication device is higher than respective associated signal strengths of wireless communication devices of other groups.

In some embodiments, the disturbance mitigation approach for determining the respective pre-coding weights for a primary one of the groups is an interference suppression approach.

In some embodiments, the disturbance mitigation approach for determining the respective pre-coding weights for a secondary one of the groups is a channel gain compensation approach.

In some embodiments (wherein a particular wireless communication device is served by the communication element and by at least one further communication element of the distributed antenna system), the determined pre-coding weights of the group of the particular wireless communication device are configured to cause constructive combination, at the particular wireless communication device, of the symbols intended for the particular wireless communication device.

A second aspect is a disturbance mitigation method of a wireless communication device served by two or more communication elements of a distributed antenna system, wherein each of the communication elements is associated with two or more antenna elements of the distributed antenna system, and wherein each of the communication elements is configured to partition the wireless communication device to a respective one of at least two groups.

The method comprises acquiring grouping information indicative of, for each of the two or more communication elements, which of the least two groups the wireless communication device is partitioned to, and determining transmission and/or reception beam-forming parameters based on the grouping information.

In some embodiments, the method further comprises using the determined reception beam-forming parameters to receive a signal comprising symbols intended for the wireless communication device and symbols intended for one or more other wireless communication devices, wherein the symbols are pre-coded using respective group pre-coding weights, wherein the respective pre-coding weights of different groups are according to different disturbance mitigation approaches, and wherein the pre-coded symbols of at least two of the groups are super-positioned to form the signal.

In some embodiments, the method further comprises using the determined transmission beam-forming parameters to transmit uplink pilot signals for channel estimation.

A third aspect is a computer program product comprising a non-transitory computer readable medium, having thereon a computer program comprising program instructions. The computer program is loadable into a data processing unit and configured to cause execution of the method according to any of the first or second aspects when the computer program is run by the data processing unit.

A fourth aspect is a disturbance mitigation apparatus for a communication element for a distributed antenna system, wherein the communication element is configured to be associated with two or more antenna elements of the distributed antenna system.

The apparatus comprises controlling circuitry configured to cause acquisition of channel condition information associated with at least two of a plurality of wireless communication devices served by the communication element, and partitioning of the plurality of wireless communication devices into at least two groups based on the acquired channel condition information.

The controlling circuitry is also configured to cause, for each of the groups, determination of respective pre-coding weights based on the acquired channel condition information, wherein the respective pre-coding weights of different groups are determined according to different disturbance mitigation approaches.

Furthermore, the controlling circuitry is configured to cause transmission of a signal comprising respective symbols intended for corresponding ones of the plurality of wireless communication devices, wherein the symbols intended for wireless communication devices of each group are pre-coded using the determined respective pre-coding weights of the group, and wherein the pre-coded symbols of at least two of the groups are super-positioned to form the signal.

A fifth aspect is a communication element for a distributed antenna system, the communication element comprising the apparatus of the fourth aspect and being configured to be associated with two or more antenna elements of the distributed antenna system.

In some embodiments, the communication element further comprises the two or more antennas.

A sixth aspect is a distributed antenna system comprising a plurality of communication elements according to the fifth aspect, each associated with two or more antenna elements.

In some embodiments, the plurality of communication elements are comprised in an antenna arrangement body having flexible structure and elongated shape.

A seventh aspect is a disturbance mitigation apparatus for a wireless communication device configured to be served by two or more communication elements of a distributed antenna system. Each of the communication elements is configured to be associated with two or more antenna elements of the distributed antenna system, and each of the communication elements is configured to partition the wireless communication device to a respective one of at least two groups.

The apparatus comprises controlling circuitry configured to cause acquisition of grouping information indicative of, for each of the two or more communication elements, which of the least two groups the wireless communication device is partitioned to, and determination of transmission and/or reception beam-forming parameters based on the grouping information.

An eighth aspect is a wireless communication device comprising the apparatus of the seventh aspect.

In some embodiments, any of the above aspects may additionally have features identical with or corresponding to any of the various features as explained above for any of the other aspects.

An advantage of some embodiments is that alternative approaches to disturbance mitigation for distributed antenna systems is provided.

Another advantage of some embodiments is that advanced disturbance mitigation may be achieved via the distributed processing principle even if the number of antenna elements of each of the communication elements (i.e., the number of antenna elements per access point) is relatively low.

Another advantage of some embodiments is that an amount of signaling between the communications elements and the central coordination apparatus is reduced.

Yet an advantage of some embodiments is that a time delay is reduced between acquisition of channel condition information and application of disturbance mitigation.

Yet another advantage of some embodiments is that disturbance mitigation accuracy may be improved.

Yet another advantage of some embodiments is that spectral efficiency may be improved.

Yet another advantage of some embodiments is that the operation temperature of components in the communication elements (e.g., in a radio stripe system comprising communication elements operating as access points distributed over a large area) may be decreased. This advantage may be particularly prominent in comparison to a solution where components are placed in a centralized location (as in traditional centralized massive MIMO); e.g., in a central coordination apparatus.

Furthermore, since multi-user interference is adequately mitigated and/or since the number of served users is not limited by the number of antenna elements of a communication element, the need for scheduling of the wireless communications devices is typically reduced.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 1 is a schematic drawing illustrating an example communication system according to some embodiments.

FIG. 2 is a flowchart illustrating example method steps according to some embodiments;

FIG. 3 is a flowchart illustrating example method steps according to some embodiments;

DETAILED DESCRIPTION

Figure 4:
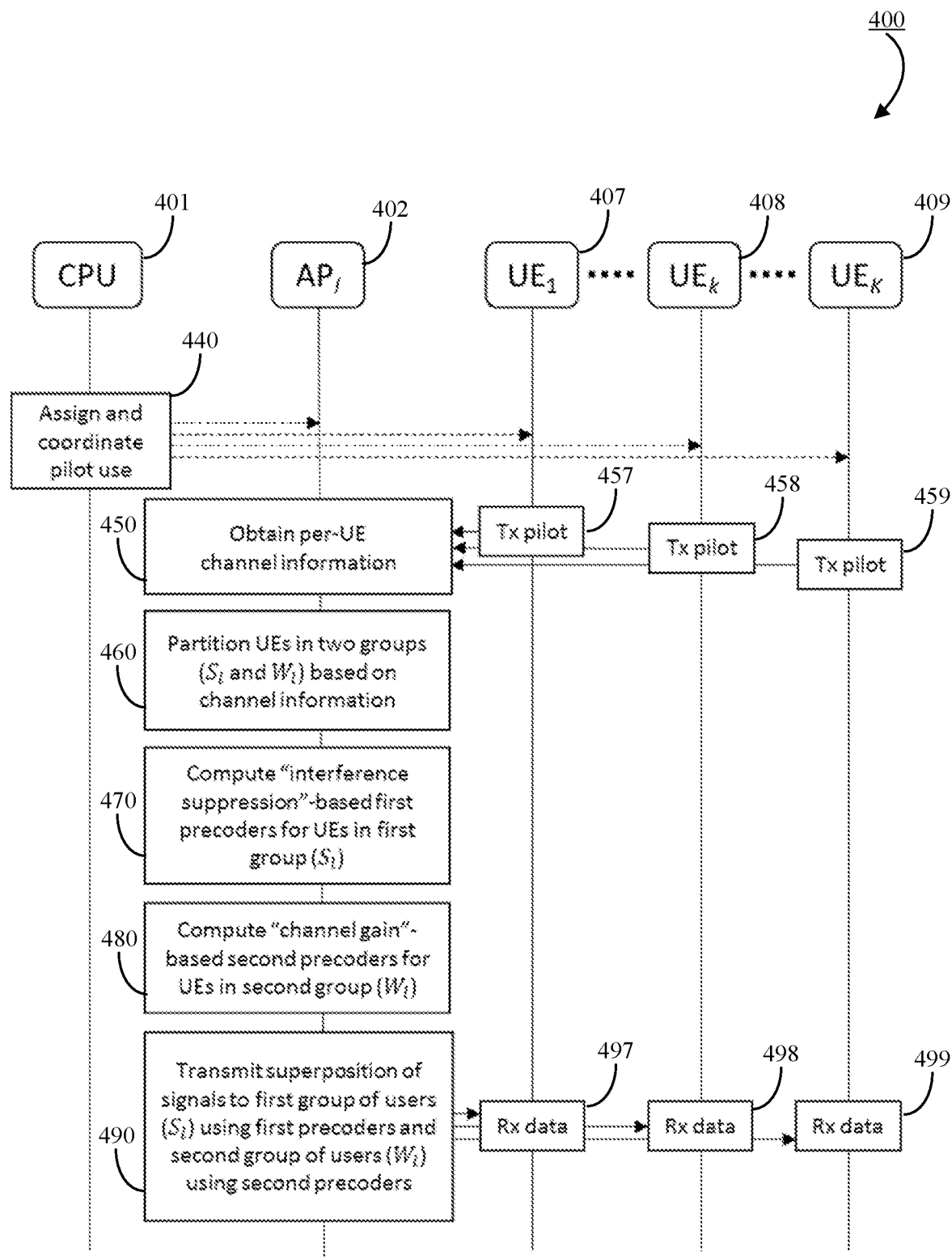
FIG. 4 is a combined flowchart and signaling diagram illustrating example method steps and signaling according to some embodiments.

The project leading to this application has received funding from the European Union's Horizon 2020 research and innovation programme under grant agreement No 641985.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Distributed antenna systems may typically use signal co-processing at multiple communication elements (access points, APs) and/or macro-diversity to mitigate disturbance (e.g., alleviate interference), and thereby achieve high spectral efficiency.

In a distributed antenna system, each communication element is associated with (e.g., comprises or is connected to) one or more antenna elements. Typically, each communication element may be associated with two or more antenna elements to enable spatial multiplexing locally at the communication element, e.g., according to principles of multiple-input, multiple-output (MIMO).

A distributed antenna system (or parts of a distributed antenna system) may be used to enable massive-MIMO on the system level; with or without local spatial multiplexing. An advantage of implementing cell-free massive-MIMO using a distributed antenna system is system scalability.

FIG. 1 schematically illustrates an example communication system 100 according to some embodiments. The communications system 100 is a distributed antenna system comprising a plurality of communication elements (access points, APs) 121, 122, 123, 131, 132, 133, 141, 142, 143. In this example, each communication element is associated with two antenna elements.

The communication elements are spread out in space (typically over a large area or volume), and they are connected to a central coordination apparatus (central unit, CU) 110 via connections 120, 130, 140. One way to achieve such a structure is to apply the principles described in WO 2018/103897 A1. Then, the connection 120 together with the communication elements 121, 122, 123 may be comprised in the body described in WO 2018/103897 A1; and similarly for the connections 130 and 140 together with the communication elements 121, 122, 123 and 131, 132, 133, respectively. Thus, the connection 120 together with the communication elements 121, 122, 123 may be comprised in an antenna arrangement for a distributed antenna system, wherein the antenna arrangement comprises a body comprising a plurality of antenna devices (communication elements) and has a flexible structure and an elongated shape; and similarly for the connections 130 and 140 together with the communication elements 121, 122, 123 and 131, 132, 133, respectively.

The central coordination apparatus 110 may be configured to provide central controlling of the system, while some control mechanisms may be performed locally; at each of the communication elements 121, . . . , 143. The central coordination apparatus 110 may comprise a central processing unit (CPU) in some embodiments.

Wireless communication devices 191, 192, 193 that are located within reach of one or more of the communication elements 121, . . . , 143 may be provided coverage by the distributed antenna system. A wireless communication device may be served by one, some, or all of the communication elements of the distributed antenna system.

The terms wireless communication device, user, and user equipment (UE) will be used interchangeably herein.

Generally, a distributed antenna system may comprise one central coordination apparatus 110, or two or more central coordination apparatuses 110, 110', 110". When there are more than one central coordination apparatus, each of them may be configured to coordinate a respective part of the distributed antenna system, wherein the parts may be disjunct, or partly or fully overlapping.

As mentioned above, disturbance mitigation in a distributed antenna system may be based on a distributed processing principle or a central processing principle. Disadvantages of the distributed processing principle include that advanced disturbance mitigation is limited by the number of antenna elements associated with the communication element and/or by processing capabilities of the communication element. Disadvantages of the central processing principle include signaling overhead and/or delay. Both principle suffers from inferior result of the disturbance mitigation (e.g., in terms of spectral efficiency). These disadvantages will now be further exemplified.

A cell-free massive-MIMO system may, in a very basic form, comprise single-antenna APs performing disturbance mitigation in the form of maximum ratio transmission (MRT) pre-coding; also known as conjugate beam-forming. The MRT approach is attractive because it is computationally simple (multiplication of the received signals by the conjugate channel responses) and because it can be performed in a distributed fashion, independently at each AP. However, the MRT approach does not provide any mechanism for multiuser interference cancelation. Thus, MRT is not efficient in interference-limited scenario.

A zero-forcing (ZF) approach is one of the simplest pre-coding schemes for eliminating (or at least mitigating) multiuser interference. By utilizing the pseudo-inverse matrix of a multiuser channel as pre-coder, the ZF approach may perfectly pre-cancel the interference at the transmitter.

However, implementing central ZF requires that channel condition information (e.g. channel state information, CSI) is sent from the APs to the CU, where the ZF pre-coder is calculated and fed back to the APs. This signalling may result in one or more of: unmanageable fronthauling traffic, performance degradation, and un-scalable architecture (growing the number of antennas and/or the number of users).

In a distributed approach (also known as full-pilot ZF, F-ZF), each AP may instead design its local ZF pre-coder by exploiting only local channel condition information (e.g. channel state information, CSI). This approach may guarantee system scalability, and typically does not increase the fronthauling overhead.

However, such an approach requires multi-antenna APs. More specifically, this approach requires that the number of antennas per AP is not less than the number of users (to ensure that a pseudo-inverse matrix of the local multiuser channel exists). Thus, the number of antenna elements per AP determines the maximum number of users for which the AP can suppress interference. Designing APs with a large number of antenna elements is costly. Moreover, a user scheduling strategy that limits the number of users to be served by a communication element may be needed.

In the following, embodiments will be described where alternative disturbance mitigation approaches are provided. The main principle of some embodiments comprises two elements.

A first element is to, at each communication element, partition the served users in two or more groups—at least a primary (first) group and a secondary (second) group. The number of users partitioned to the primary group are limited to a maximum number (typically equal to the number of antenna elements associated with the communication element).

A second element is to apply different disturbance mitigation techniques for the different groups. Typically, an interference suppression approach (e.g., ZF) may be applied for disturbance mitigation of the primary group and a channel gain compensation approach (e.g., MRT) may be applied for disturbance mitigation of the secondary group.

Thereby, the advantages of local interference suppression may be achieved without the number of antenna elements limiting the number of users that can be served.

FIG. 2 illustrates an example disturbance mitigation method 200 according to some embodiments. The method 200 is for a communication element of a distributed antenna system. Thus, the method 200 may, for example, be performed by any of the communication elements 121, . . . 143 of FIG. 1.

The communication element is associated with two or more antenna elements of the distributed antenna system. For example, the communication element may comprise the two or more antenna elements. Alternatively, the communication element may be connectable (e.g., connected) to the two or more antenna elements.

In step 210, channel condition information associated with at least two of a plurality of wireless communication devices served by the communication element is acquired. The channel condition information may, for example comprise one or more of a signal strength estimation, a channel estimation, and channel state information.

The at least two wireless communication devices may be all communication devices served by the communication element, or may be a sub-set of communication devices served by the communication element.

Generally, channel condition information may comprise any suitable information associated with the channel, e.g., channel state information (CSI), path loss, received signal strength, noise information, interference information, etc.

In some embodiments, acquiring the channel condition information may comprise receiving a signal (e.g., from a central coordination apparatus or from one or more other communication elements) indicative of the channel condition information.

However, acquiring the channel condition information typically comprises determining the channel condition information based on measurements made at the communication element (e.g., based on pilot signals received from the at least two wireless communication devices).

In some embodiments, the wireless communication devices served by the communication element may be configured to transmit pilot signals that are distinguishable from each other. Alternatively, some of the wireless communication devices served by the communication element may be configured to transmit pilot signals that are non-distinguishable from each other. For example, each of the at least two wireless communication devices may belong to a set of wireless communication devices assigned a same uplink pilot signal.

There is a respective channel between each of the at least two wireless communication devices and each of the two or more antenna elements. When a set of wireless communication devices is assigned a same uplink pilot signal there is a composite channel between each set of wireless communication devices and each of the two or more antenna elements.

Acquiring channel condition information may comprise receiving uplink pilot signals transmitted by the at least two wireless communication devices, and determining a channel estimate based on measurements performed on the uplink pilot signals, for each of the respective channels and/or for each of the composite channels, as applicable.

Generally, a channel estimate may comprise an estimation of any suitable metric related to the channel (e.g., path loss, fading, etc.). Typically, the channel estimate comprises an estimation of the channel response, which includes a large-scale fading coefficient that accounts for path loss and shadowing and a small-scale fading coefficient that accounts for fast fading.

In step 220 the plurality of wireless communication devices served by the communication element are partitioned into at least two groups based on the acquired channel condition information. The groups are typically disjunct.

In some embodiments, partitioning the plurality of wireless communication devices into at least two groups comprises partitioning a first wireless communication device to a first (primary) group when an associated signal strength (or any other suitable signal quality metric) of the first wireless communication device is higher than respective associated signal strengths (or any other suitable signal quality metric) of wireless communication devices of other groups.

For example, the wireless communication devices that are associated with the highest signal strengths (or any other suitable signal quality metric) may be partitioned into a primary group and the remaining wireless communication devices may be partitioned into a secondary group. The signal strengths associated with the wireless communication devices may be determined from the channel condition information according to any suitable approach. For example, signal strengths associated with the wireless communication devices may be determined as the signals strength of received pilot signals, and/or as a magnitude of an estimated channel response (channel gain).

The partition of wireless communication devices into groups may comprise comparing a signal quality metric of each wireless communication device to a (static or dynamic) threshold value and partitioning a wireless communication device into a primary group when the signal quality metric falls on a first side of (e.g., above) the threshold value, and partitioning the wireless communication device into a secondary group otherwise.

The partition of wireless communication devices into groups may comprise partitioning a maximum number (e.g., equal to the number of antenna elements associated with the communication element) of wireless communication devices into a primary group.

When a set of wireless communication devices is assigned a same uplink pilot signal, partitioning the plurality of wireless communication devices into at least two groups typically comprises partitioning wireless communication devices assigned the same uplink pilot signal to a same group.

In step 230, respective pre-coding weights are determined for each of the groups based on the acquired channel condition information. The respective pre-coding weights of different groups are determined according to different disturbance mitigation approaches.

Typically, the disturbance mitigation approach for determining the respective pre-coding weights for a primary one of the groups is an interference suppression approach (e.g., ZF), and the disturbance mitigation approach for determining the respective pre-coding weights for a secondary one of the groups is a channel gain compensation approach (e.g., MRT, conjugate beam-forming, matched filtering).

The determination of the pre-coding weights based on the acquire channel condition information may be in accordance with any suitable technique for determining pre-coding weights. A pseudo-inverse of a matrix describing the multi-user channel may be used as pre-coding weights in a primary group. The complex conjugate of an acquired channel response estimate may be used as pre-coding weights in a secondary group.

In step 240, a signal comprising respective symbols intended for corresponding ones of the plurality of wireless communication devices is transmitted. The symbols intended for wireless communication devices of each group are pre-coded using the determined respective pre-coding weights of the group, and the pre-coded symbols of at least two of the groups are super-positioned (typically in the time domain) to form the signal.

Generally, that the pre-coded symbols of at least two of the groups are super-positioned to form the signal may refer to the pre-coded symbols of at least two of the groups sharing at least one transmission resource (e.g., in one or more of a time domain, a frequency domain, a code domain, and a spatial domain).

When a particular wireless communication device is served by two or more communication elements of the distributed antenna system, the determined pre-coding weights of the group of the particular wireless communication device may be selected such that the symbols intended for the particular wireless communication device are constructively combined at the particular wireless communication device. This approach may require that the two or more communication elements are phase-synchronized.

FIG. 3 illustrates an example disturbance mitigation method 300 according to some embodiments. The method 300 is for a wireless communication device served by two or more communication elements of a distributed antenna system. The method 200 may, for example, be performed by any of the wireless communication devices 191, 192, 193 of FIG. 1.

Each of the communication elements serving the wireless communication device is associated with two or more antenna elements of the distributed antenna system. For example, the communication element may comprise the two or more antenna elements. Alternatively, the communication element may be connectable (e.g., connected) to the two or more antenna elements.

Furthermore, each of the communication elements serving the wireless communication device is configured to partition the wireless communication device to a respective one of at least two groups, e.g., as described above in connection to step 220 of FIG. 2.

In step 310, grouping information is acquired. The grouping information is indicative of, for each of the two or more communication elements, which of the least two groups the wireless communication device is partitioned to.

The grouping information can, for example, be acquired by reception of signalling from one or more of the communication elements serving the wireless communication device and/or from a central coordination apparatus (which in turn has typically received such information from the communication elements). Such signalling may be indicative of which of the least two groups the wireless communication device is partitioned to by one or more of the communication elements serving the wireless communication device.

For example, signalling may be received from each of the communication elements serving the wireless communication device, whereby each of the communication elements indicates which groups the wireless communication device is partitioned to by that communication element.

The grouping information can, alternatively or additionally, be acquired by determining a probable partition of the wireless communication device by each of the communication elements serving the wireless communication device. Such a determination may, for example, be based on a signal strength of pilot signals received from the communication elements (e.g., determining that the wireless communication device is probably partitioned into a primary group by communication elements for which the signal strength of received pilots exceed a threshold value, and determining that the wireless communication device is probably partitioned into a non-primary—e.g., secondary—group by other communication elements).

In step 320, beam-forming parameters for transmission and/or reception are determined based on the grouping information. The beam-forming parameters may, for example, be determined such that transmission and/or reception beams are spatially directed towards communication elements that have partitioned the wireless communication device into a primary group.

The determined bema-forming parameters are then used for transmission and/or reception as illustrated in step 330.

In some embodiments, the determined beam-forming parameters may be used in step 330 to receive a signal comprising symbols intended for the wireless communication device and symbols intended for one or more other wireless communication devices, e.g., a signal as the one transmitted in step 240 of FIG. 2.

Alternatively or additionally, the determined beam-forming parameters may be used in step 330 to transmit uplink pilot signals for channel estimation, e.g., pilot signals as described in connection with step 210 of FIG. 2.

Thus, according to various embodiments, a partial zero-forcing (P-ZF) approach suitable for application in distributed cell-free massive MIMO systems is provided.

According to some embodiments, each AP only suppresses the interference it causes to the strongest UEs (e.g., the UEs with the strongest channel gain; that presumably interfere the most), and the interference caused to the weakest UEs is assumed to be tolerable.

More specifically, for an arbitrary AP, the set of the active UEs may be divided in two or more disjoint subsets (groups): a primary subset which gathers all the strong UEs, and a secondary subset (or subsets) which gather weak UEs. Then, each AP may adopt an interference suppression pre-coding scheme (e.g., F-ZF) to serve the UEs belonging to the primary subset, and matched filtering (or channel gain based) schemes (e.g., maximum ratio transmission) to serve the UEs belonging to the secondary subset(s).

One advantage by the solutions according to some embodiments is that P-ZF is performed locally at each AP and it does not require any CSI to be exchanged between APs and CU. Hence, this solution does not introduce additional fronthauling overhead.

To be implemented, P-ZF requires multi-antenna APs. However, the number of antennas per AP must be at least equal to the cardinality of the strong UEs set (which is, by design, smaller than the total number of UEs). One advantage by the solutions according to some embodiments is that P-ZF enables deployment of APs equipped with few antenna elements, while guaranteeing mechanisms of interference suppression.

One advantage by the solutions according to some embodiments is that there is no need for a UE scheduling strategy. All the UEs can be served simultaneously. The UE grouping criterion selects the cardinality of the strong UEs set based on the AP design (i.e., the number of AP antennas).

One advantage by the solutions according to some embodiments is that P-ZF provides larger spectral efficiency than any other conventional pre-coding schemes.

In order to exemplify the effectiveness of some embodiments disclosed herein an exemplifying analysis is provided of a cell-free massive MIMO system operating in time division duplex (TDD) mode in which all active UEs are simultaneously served by all the APs. It will be assumed that L, M, K denote the number of APs, antenna elements per AP, and active UEs, respectively, with LM>>K, and the UEs are assumed to be equipped with a single antenna.

The channel response between the k-th UE and the l-th AP is denoted by $h_{l,k} = \sqrt{\beta_{l,k}} g_{l,k} \in \mathbb{C}^{M \times 1}$, where $\beta_{l,k}$ represents large-scale fading and $g_{l,k}$ represents small-scale fading. In this example, it is assumed that the small-scale fading follows a Rayleigh distribution. The channel matrix, for the l-th AP, is denoted by $H_l = [h_{l,1}, \ldots, h_{l,K}] \in \mathbb{C}^{M \times K}$.

According to the conventional cell-free massive MIMO operation, the uplink channels are estimated by each AP based on pilots sent by each UEs during an uplink training interval (pilots are sequences known at both ends of a communication link). Such channel estimates between the k-th UE and the l-th AP are denoted by $\hat{h}_{l,k}$.

The AP cannot distinguish UEs having the same pilot since the channel estimates related to those UEs will be linearly dependent. Hence, if some UEs share the same pilot (pilot reuse), the channel estimate matrix $\hat{H}_l = [\hat{h}_{l,1}, \ldots, \hat{h}_{l,K}]$ is rank-deficient. The corresponding full-rank matrix, consisting of the rows/columns of $\hat{H}_l$ that are linearly independent, may be denoted by $\bar{H}_l$. Thus, this matrix is used by the l-th AP to define its local P-ZF pre-coders for the active UEs.

If no UEs share the same pilot, the channel estimates will be linearly independent. Hence, in case of no pilot reuse, $\hat{H}_l = \bar{H}_l$ is a full-rank matrix.

In one simple configuration of P-ZF, the set of the active UEs for an arbitrary AP l is divided in two disjoint subsets: (i) strong UEs—primary group, and (ii) weak UEs—secondary group, where $S_l \subset \{1, \ldots, K\}$, and $W_l \subset \{1, \ldots, K\}$ denote the set of indices of strong and weak UEs, respectively. For example, in the scenario of FIG. 1, AP 132 may consider that UEs 192 and 193 belong to the primary group and that UE 191 belongs to the secondary group, while AP 131 may consider that UEs 191 and 192 belong to the primary group and that UE 193 belongs to the secondary group.

In this example, P-ZF may be implemented such that the AP l adopts F-ZF with pre-coding weights $w_{l,i_k}^{F-ZF}$ to serve all the UEs belonging to $S_l$, and maximum ratio transmission with pre-coding weights $w_{l,i_j}^{MRT}$ to serve all the UEs belonging to $W_l$. Hence, the signal $x_l$ transmitted by AP 1 using P-ZF is may be given by:

$$x_l = \sum_{k \in S_l} \sqrt{\rho_{l,k}} \, w_{l,i_k}^{F-ZF} q_k + \sum_{j \in W_l} \sqrt{\rho_{l,j}} \, w_{l,i_j}^{MRT} q_j,$$

where $q_k$ and $q_j$ denotes the data symbol intended for UEs k and j, respectively; $\rho_{l,k}$ and $\rho_{l,j}$ are power control coefficients; and $i_k, i_j \in \{1, \ldots, \tau_p\}$ indicates the index of the pilot used by UEs k and j, respectively.

In this example, it is assumed that pilot sequences are mutually orthogonal and $\tau_p$ symbols long. Letting the pilot sequence of UE k be denoted by $\phi_{i_k}$, and letting $\mathcal{P}_k \subset \{1, \ldots, K\}$ denote the set of indices (including k) of UEs that transmit the same pilot as UE k, then $$\phi_{i_t}^H \phi_{i_k} = \begin{cases} 0, & t \notin \mathcal{P}_k, \\ \tau_p, & t \in \mathcal{P}_k. \end{cases}$$

Typically, when two or more UEs are assigned the same pilot and one of these UEs is in $S_l$, then automatically all of them belongs to $S_l$ since the AP is not able to separate them spatially. It is also assumed that $\tau_{S_l}$ denotes the number of different pilots used by the UEs$\in S_l$, and $$\mathcal{R}_{S_l} = \{r_{l,1}, \ldots, r_{l,\tau_{S_l}}\}$$

is defined as the set of the corresponding pilot indices.
A further matrix $$E_{S_l} = \left[ e_{r_{l,1}}, \ldots, e_{r_{l,\tau_{S_l}}} \right]$$

is defined in this example, where $e_{r_{l,i}}$ is the $r_{l,i}$-th column of $I_{\tau_p}$ (an identity matrix of size $\tau_p$). If $j_{l,k} \in \{1, \ldots, \tau_{S_l}\}$ denotes the index of the pilot used by UE $k \in S_l$, then the $j_{l,k}$-th column of $$I_{\tau_{S_l}}$$

may be denoted $\epsilon_{j_{l,k}}$, which entails that $E_{S_l} \epsilon_{j_{l,k}} = e_{i_k}$.

The full-pilot zero-forcing pre-coding vector used by AP 1 towards all the UEs$\in \mathcal{P}_{j_k}$ may be defined as $$w_{l,i_k}^{F-ZF} = c \cdot \overline{H}_l E_{S_l} (E_{S_l}^H \overline{H}_l^H \overline{H}_l E_{S_l})^{-1} \epsilon_{j_{l,k}}$$

where c is a normalization coefficient that can be used to set the pre-coder with unitary power. The expression for the full-pilot zero-forcing pre-coding vector converges to the expression of the conventional full-pilot zero-forcing (cF-ZF) pre-coder, defined as $$w_{l,i_k}^{cF-ZF} = c \cdot \overline{H}_l (\overline{H}_l^H \overline{H}_l)^{-1} e_{i_k}$$

when there is no UE grouping, resulting in $S_l = \{1, \ldots K\}$ and $E_{S_l} = I_{\tau_p}$.

The maximum-ratio transmission pre-coding vector used by AP 1 towards all the UEs$\in \mathcal{P}_j$, defined as $$w_{l,i_j}^{MRT} = d \cdot \overline{H}_l e_{i_j}$$

where d is a normalization coefficient that can be used to set the pre-coder with unitary power.

An achievable downlink spectral efficiency for UE k, with P-ZF, is given by $\log_2(1+\text{SINR}_k)$, where $\text{SINR}_k$ is the signal-to-interference-plus-noise at UE k;

$$\text{SINR}_k = \frac{\left( \sum_{l=1}^L \sqrt{(M - \delta_{l,k} \tau_{S_l}) \rho_{l,k} \gamma_{l,k}} \right)^2}{\sum_{t \in \mathcal{P}_k \backslash \{k\}} \left( \sum_{l=1}^L \sqrt{(M - \delta_{l,k} \tau_{S_l}) \rho_{l,k} \gamma_{l,k}} \right)^2 + \sum_{t=1}^K \sum_{l=1}^L \rho_{l,t} (\beta_{l,k} - \delta_{l,t} \gamma_{l,k}) + 1}$$

where $\gamma_{l,k}$ is the variance of the channel estimate $\hat{h}_{l,k}$, and $$\delta_{l,k} = \begin{cases} 1, & \text{if } AP\,l \text{ adopts } F\text{-}ZF \text{ to } UE\,k, \\ 0, & \text{if } AP\,l \text{ adopts } MRT \text{ to } UE\,k \end{cases}.$$

FIG. 4 is a combined flowchart and signaling diagram 400 illustrating example method steps and signaling according to some embodiments. FIG. 4 illustrates an example disturbance mitigation approach for distributed antenna system.

The approach illustrated in FIG. 4 involves a central coordination apparatus (e.g. the central coordination apparatus 110 of FIG. 1) comprising a central processing unit (CPU) 401, a communication element (AP$_l$) 402 (e.g. any of the communication elements 121, . . . 143 of FIG. 1), and K wireless communication devices (UE$_1$, . . . , UE$_k$, . . . , UE$_K$) 407, 408, 409 served by the communication element (e.g. one or more of the wireless communication devices 191, 192, 193 of FIG. 1).

In step 440, the central coordination apparatus assigns and coordinates uplink pilot use. For example, step 440 may comprise deciding which of a number of available pilot signals each wireless communication device should transmit. In some embodiments, two or more of the wireless communication devices may be assigned a same pilot signal as elaborated on above in connection with FIG. 2. In other embodiments, all wireless communication devices served by the communication element 402 are assigned different pilot signals. The central coordination apparatus informs the communication element and the wireless communication devices (typically via the communication element) of the pilot signal assignment as illustrated in connection with step 440.

In steps 457, 458, 459, each of the wireless communication devices 407, 408, 409 transmits the assigned pilot signal, which transmissions are used by the communication element 402 in step 450 to obtain per-UE channel information (compare with step 210 of FIG. 2).

In step 460, the communication element 402 partitions the UEs 407, 408, 409 into two groups (a primary group $S_l$ and a secondary group $W_l$) based in the channel information (compare with step 220 of FIG. 2).

In steps 470 and 480, the communication element 402 computes interference suppression (e.g., ZF) based pre-coders for the UEs partitioned into the primary group and channel gain (e.g., MRT) based pre-coders for the UEs partitioned into the secondary group (compare with step 230 of FIG. 2).

In step 490, the communication element transmits a superposition of data signals to the primary and secondary groups of UEs using the pre-coders of steps 470 and 480

(compare with step 240 of FIG. 2), and the transmitted data is received by the respective UEs in steps 497, 498, 499.

When UEs are capable to apply beam-forming for transmissions and/or receptions (i.e., when they are equipped with multiple antenna elements and other required beam-forming functionality) they can take a more active part in the communication than they do in embodiments such as those illustrated in FIG. 4.

For example, a UE may obtain knowledge about which APs have partitioned it into the primary group. Such information can be used by the UE, for example, to beam-form its UL pilot transmission and/or its DL data reception towards the APs that consider the UE to be in the primary group.

Figure 5:
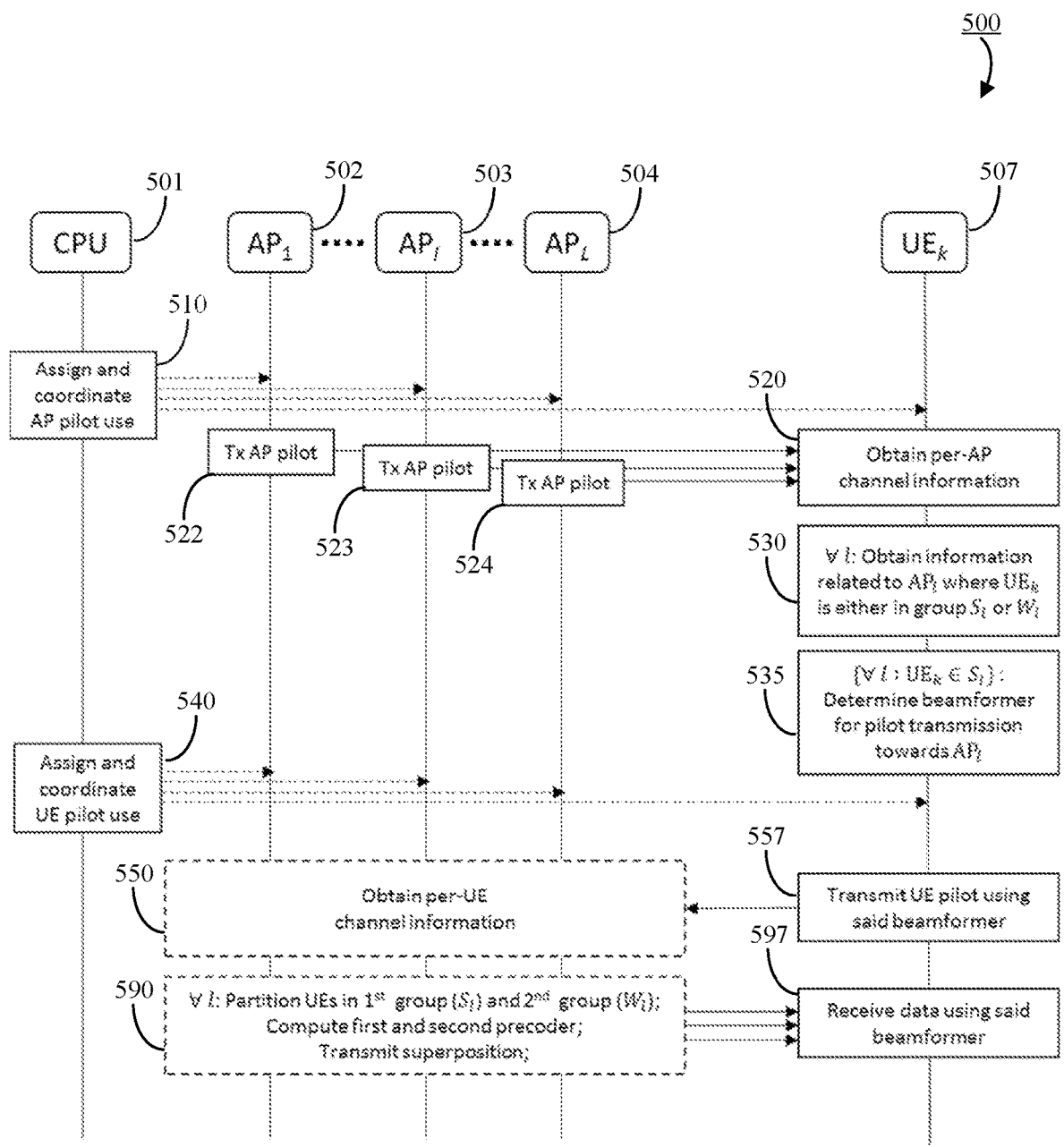
FIG. 5 is a combined flowchart and signaling diagram illustrating example method steps and signaling according to some embodiments.

An example of how such embodiments can be implemented is illustrated in FIG. 5, which shows a combined flowchart and signaling diagram 500 illustrating example method steps and signaling according to some embodiments. FIG. 5 illustrates an example disturbance mitigation approach for distributed antenna system.

The approach illustrated in FIG. 5 involves a central coordination apparatus (e.g. the central coordination apparatus 110 of FIG. 1) comprising a central processing unit (CPU) 501, L communication elements ($AP_1, \ldots, AP_l, \ldots, AP_L$) 502, 503, 504 (e.g. any of the communication elements 121, ... 143 of FIG. 1), and a wireless communication device (UE) 507 served by the communication elements (e.g. any of the wireless communication devices 191, 192, 193 of FIG. 1).

In step 510, the central coordination apparatus assigns and coordinates downlink pilot use. For example, step 510 may comprise deciding which of a number of available pilot signals each communication element should transmit. The central coordination apparatus informs the communication elements and the wireless communication device of the pilot signal assignment as illustrated in connection with step 510.

In steps 522, 523, 524, each of the communication elements 502, 503, 504 transmits the assigned pilot signal, which transmissions are used by the wireless communication device 507 in step 520 to obtain per-AP channel information.

In step 530, the wireless communication device 507 obtains information, for each of the communication elements 502, 503, 504, regarding which group the wireless communication device is partitioned to; a primary group $S_l$ and a secondary group $W_l$ (compare with step 310 of FIG. 3). Such grouping information may, for example, be received from the communication elements (e.g., based on a previously performed step 590), or may be estimated by the wireless communication device (e.g., based on the pilot signals received in step 520).

Thus, step 530 may be implemented in different ways. One way is that the central coordination apparatus collects the information from all the APs and informs the UE 507 using in-band control information (not shown in FIG. 5). Another way is that the UE may attempt to estimate the information on its own using measurements on the reference signals (e.g., the pilots or other signals) transmitted in the DL from the APs.

In step 535, the wireless communication device 507 determines transmit beam-forming parameters for all communication elements that has partitioned the wireless communication device into the primary group (compare with step 320 of FIG. 3).

Step 535 may also be implemented in different ways. The UE 507 may, for example, first determine a suitable AP-specific beam (e.g. based on MRT) for each AP where the UE is in group $S_l$, and then construct a beam to be used for transmission and/or reception as a linear combination of said AP-specific beams.

In step 540, the central coordination apparatus assigns and coordinates uplink pilot use (compare with step 440 of FIG. 4) and informs the communication elements and the wireless communication thereof as illustrated in connection with step 540.

In step 557, the wireless communication device 507 transmits the assigned pilot signal, which transmission is used by the communication elements 502, 503, 504 in step 550 to obtain per-UE channel information (compare with step 210 of FIG. 2 and with steps 457, 458, 459, 450 of FIG. 4). The transmit beam-forming parameters determined in step 535 may be used in step 557 for communication elements that has partitioned the wireless communication device into the primary group.

In step 590, the communication elements 502, 503, 504 partitions the UEs into two groups (a primary group $S_l$ and a secondary group $W_l$) based in the channel information, computes interference suppression based pre-coders for the UEs partitioned into the primary group and channel gain based pre-coders for the UEs partitioned into the secondary group, and transmits a superposition of data signals to the primary and secondary groups of UEs using the pre-coders (compare with steps 220, 230, 240 of FIG. 2 and with step 460, 470, 480, 490 of FIG. 4), and the transmitted data is received by the UE 507 in step 597.

Figure 6:
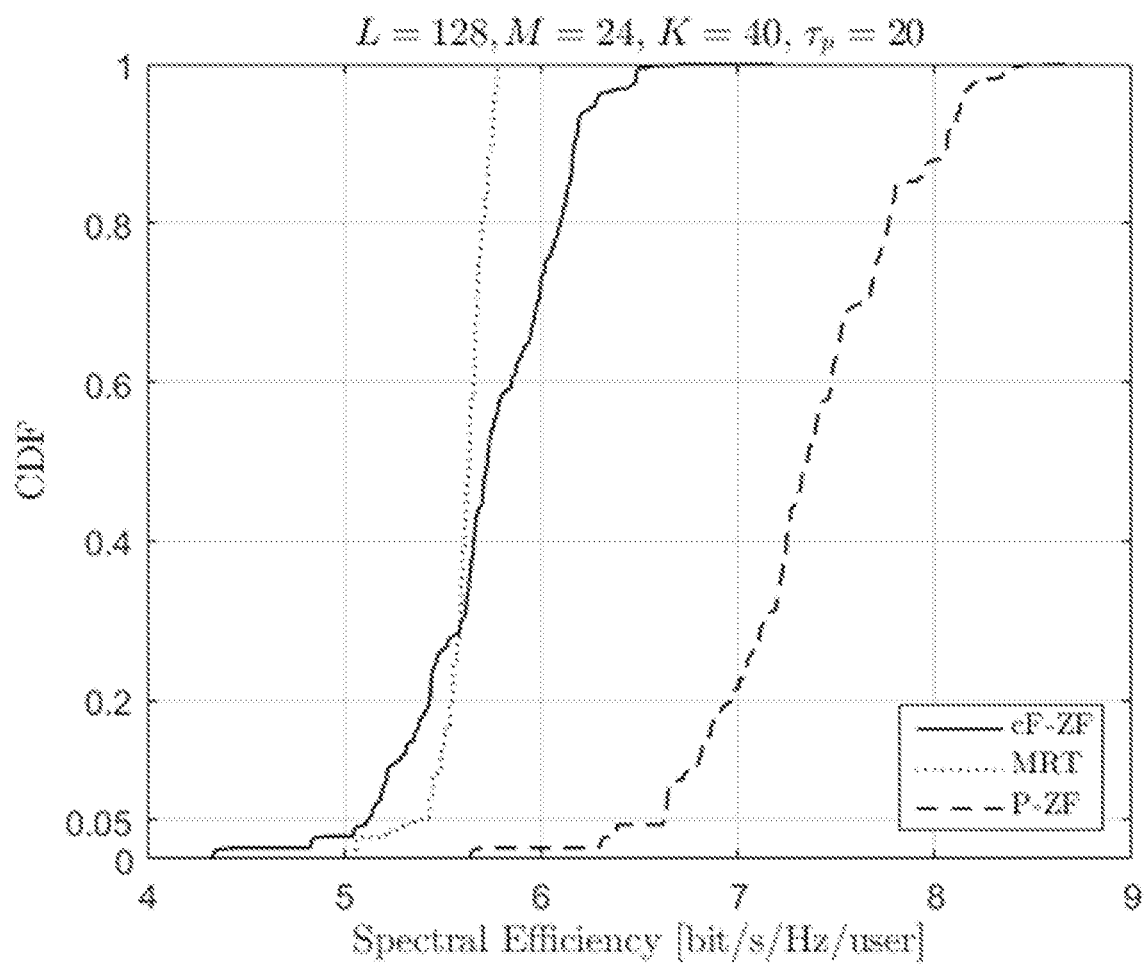
FIG. 6 is a plot illustrating example results achievable according to some embodiments.

FIG. 6 illustrating example results of a performance evaluation for some embodiments. A cell-free massive MIMO system, as described in the following table, is assumed with K=40 UEs and L=128 APs, the APs equipped with M=24 antennas each.

| PARAMETER | VALUE |
| --- | --- |
| Simulation area | 1 km² |
| Coherence Interval τ | 200 samples |
| Carrier Frequency f | 2 GHz |
| Bandwidth | 20 MHz |
| Small-scale fading model | i.i.d. independent Rayleigh fading |
| Large-scale fading model | three-slope pathloss model + uncorrelated shadow fading with standard deviation 8 dB |
| AP antenna height $h_{AP}$ | 5 m |
| UE antenna height $h_u$ | 1.65 m |
| Per-AP radiated power | 100 mW |
| Per-UE radiated power | 50 mW |
| $d_1, d_0$ | 50, 10 |

A three-slope model is used for the path loss: the path loss exponent equals 3.5 when the distance between the m-th AP and the k-th user (denoted by $d_{mk}$) is greater than $d_1$, the path loss exponent equals 2 when $d_1 \geq d_{mk} > d_0$, and the path loss exponent equals 0 when $d_{mk} \leq d_0$; for some suitable $d_0$ and $d_1$. When $d_{mk} > d_1$, the Hata-COST231 propagation model is employed. More precisely, according to the Hata-COST231 propagation model, the path loss (PL) in dB is given by $$PL_{mk} = \begin{cases} -L - 35\log_{10}d_{mk}, & \text{if } d_{mk} > d_1 \\ -L - 15\log_{10}d_1 - 20\log_{10}d_{mk}, & \text{if } d_0 < d_{mk} \leq d_1 \\ -L - 15\log_{10}d_1 - 20\log_{10}d_0, & \text{if } d_{mk} \leq d_0 \end{cases}$$

where $L=46.3+33.9 \log_{10}(f)-13.82 \log_{10}(h_{AP})--(1.1 \log_{10}(f)-0.7)h_u+(1.56 \log_{10}(f)-0.8),$ and where f denotes the carrier frequency, $h_{AP}$ denotes the antenna height of access point antenna elements, and $h_u$ denotes the antenna height of UE antenna elements.

It is assumed in this example that a max-min fairness (MMF) power control policy is performed in the downlink, according to which the power radiated by each AP (i.e., the power control coefficients $\{\rho_{l,k}\}$) is chosen to maximize the minimum spectral efficiency in the network. The goal of this policy is to deliver the same spectral efficiency to all UEs and maximizing the rate, leading to a uniformly good UE service in the network. In this example, focus will be on the 95%-likely per-user downlink spectral efficiency as main performance metric, i.e., the minimum spectral efficiency that can be provided to 95% of the active UEs in the network.

The UE grouping criterion adopted in these simulations is based on largest large scale fading coefficients. More specifically, each AP selects the UEs with the largest large scale fading coefficient to belong to the primary group, as follows:

$$\sum_{k=1}^{|S_l|} \frac{\bar{\beta}_{l,k}}{\sum_{j=1}^{K} \beta_{l,j}} \geq \alpha \%$$

where $\{\bar{\beta}_{l,1}, \ldots, \bar{\beta}_{l,K}\}$ is the set of the large scale fading coefficients sorted in descending order, and $\alpha$ % is set to 90%. Thus, only the UEs that together contribute with at least 90% of the total channel quality towards AP l are selected.

FIG. 6 shows the cumulative distribution function (CDF) of the per-user downlink spectral efficiency in bit/s/Hz/user for three different pre-coding schemes: the pre-coding scheme proposed according to some embodiments (P-ZF) illustrated by dashed line, conventional full-pilot zero-forcing pre-coding (cF-ZF) according to the prior art illustrated by solid line, and maximum-ratio transmission (MRT) according to the prior art illustrated by dotted line.

An additional scheme according to the prior art is regularized zero-forcing pre-coding. Regularized zero-forcing pre-coding is enhanced processing that considers the impact on a background noise and performs the same as cF-ZF in this scenario.

Looking at the 95%-likely per-user downlink spectral efficiency, the results show that P-ZF outperforms cF-ZF with about 30%, and MRT with about 25%. Furthermore and as mentioned before, cF-ZF requires the APs to be equipped with a number of antennas $M \geq \tau_p$, while P-ZF only requires $M \geq \tau_{S_l}$. Since $\tau_p \geq \tau_{S_l}$, P-ZF enables less strict AP design requirements and the AP design requirements can be easily satisfied by setting $\alpha$ (which determines the cardinality of set $S_l$) accordingly. Hence, no scheduling mechanism are needed to handle the maximum number of UEs to serve in the TDD frame.

Figure 7:
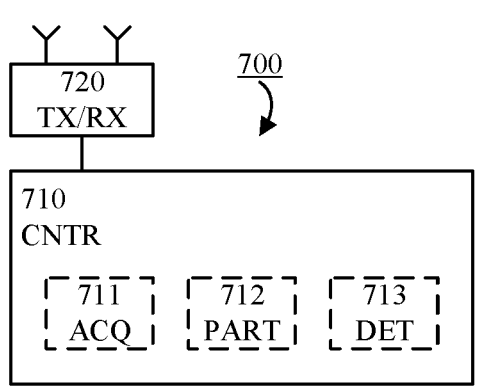
FIG. 7 is a schematic block diagram illustrating an example arrangement according to some embodiments.

FIG. 7 schematically illustrate an example apparatus 700 according to some embodiments. The example apparatus is a disturbance mitigation apparatus for a communication element for a distributed antenna system, wherein the communication element is configured to be associated with two or more antenna elements of the distributed antenna system. Thus, the apparatus 700 may be comprised in any of the communication elements 121, 122, 123, 131, 132, 133, 141, 142, 143, 402, 502, 503, 504 described in connection with FIGS. 1, 4 and 5 and/or the apparatus 700 may be configured to perform method steps of any of the methods described in connection with FIGS. 2, 4 and 5. The apparatus comprises controlling circuitry (CNTR; e.g. a controller or a control unit) 710.

The controlling circuitry is configured to cause acquisition of channel condition information associated with at least two of a plurality of wireless communication devices served by the communication element (compare with step 210 of FIG. 2). To this end, the controlling circuitry may comprise, or be otherwise associated with (e.g., connectable, or connected, to) acquiring circuitry (ACQ; e.g., an acquirer or an acquisition unit) 711. The acquiring circuitry may be configured to acquire channel condition information associated with at least two of a plurality of wireless communication devices served by the communication element (compare with step 210 of FIG. 2).

The controlling circuitry is also configured to cause partitioning of the plurality of wireless communication devices into at least two groups based on the acquired channel condition information (compare with step 220 of FIG. 2). To this end, the controlling circuitry may comprise, or be otherwise associated with (e.g., connectable, or connected, to) partitioning circuitry (PART; e.g., a partitioner or a partition unit) 712. The partitioning circuitry may be configured to partition the plurality of wireless communication devices into the at least two groups based on the acquired channel condition information (compare with step 220 of FIG. 2).

The controlling circuitry is further configured to cause, for each of the groups, determination of respective pre-coding weights based on the acquired channel condition information, wherein the respective pre-coding weights of different groups are determined according to different disturbance mitigation approaches (compare with step 230 of FIG. 2). To this end, the controlling circuitry may comprise, or be otherwise associated with (e.g., connectable, or connected, to) determining circuitry (DET; e.g., a determiner or a determination unit) 713. The determining circuitry may be configured to determine respective pre-coding weights based on the acquired channel condition information, wherein the respective pre-coding weights of different groups are determined according to different disturbance mitigation approaches (compare with step 230 of FIG. 2). The determining circuitry 713 may, for example, be pre-coding circuitry.

The controlling circuitry is further configured to cause transmission of a signal comprising respective symbols intended for corresponding ones of the plurality of wireless communication devices, wherein the symbols intended for wireless communication devices of each group are pre-coded using the determined respective pre-coding weights of the group, and wherein the pre-coded symbols of at least two of the groups are super-positioned to form the signal (compare with step 240 of FIG. 2). To this end, the controlling circuitry may comprise, or be otherwise associated with (e.g., connectable, or connected, to) transmitting circuitry (TX; e.g., a transmitter or a transmission unit). In FIG. 7, the transmitting circuitry is illustrated as part of transceiver circuitry (TX/RX) 720. The transmitting circuitry may be configured to transmit a signal comprising respective symbols intended for corresponding ones of the plurality of wireless communication devices, wherein the symbols intended for wireless communication devices of each group are pre-coded using the determined respective pre-coding weights of the group, and wherein the pre-coded symbols of at least two of the groups are super-positioned to form the signal (compare with step 240 of FIG. 2).

Figure 8:
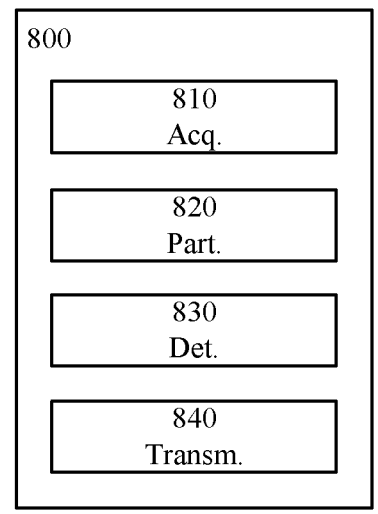
FIG. 8 is a schematic block diagram illustrating an example arrangement according to some embodiments.

FIG. 8 schematically illustrate an example arrangement 800 according to some embodiments. The example arrangement is a disturbance mitigation arrangement for a communication element for a distributed antenna system, wherein the communication element is configured to be associated with two or more antenna elements of the distributed antenna system. Thus, the arrangement 800 may be comprised in any of the communication elements 121, 122, 123, 131, 132, 133, 141, 142, 143, 402, 502, 503, 504 described in connection with FIGS. 1, 4 and 5 and/or the arrangement 800 may be configured to perform method steps of any of the methods described in connection with FIGS. 2, 4 and 5.

The arrangement 800 comprises an acquisition unit (Acq.) 810 configured to acquire channel condition information associated with at least two of a plurality of wireless communication devices served by the communication element (compare with step 210 of FIG. 2).

The arrangement 800 also comprises a partition unit (Part.) 820 configured to partition the plurality of wireless communication devices into the at least two groups based on the acquired channel condition information (compare with step 220 of FIG. 2).

The arrangement 800 further comprises a determination unit (Det.) 830 configured to determine respective pre-coding weights based on the acquired channel condition information, wherein the respective pre-coding weights of different groups are determined according to different disturbance mitigation approaches (compare with step 230 of FIG. 2).

The arrangement also comprises a transmission unit (Transm.) 840 configured to transmit a signal comprising respective symbols intended for corresponding ones of the plurality of wireless communication devices, wherein the symbols intended for wireless communication devices of each group are pre-coded using the determined respective pre-coding weights of the group, and wherein the pre-coded symbols of at least two of the groups are super-positioned to form the signal (compare with step 240 of FIG. 2).

Figure 9:
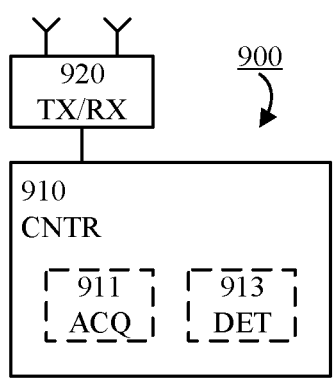
FIG. 9 is a schematic block diagram illustrating an example arrangement according to some embodiments.

FIG. 9 schematically illustrate an example apparatus 900 according to some embodiments. The example apparatus is a disturbance mitigation apparatus for a wireless communication device configured to be served by two or more communication elements of a distributed antenna system, wherein each communication element is configured to be associated with two or more antenna elements of the distributed antenna system. Thus, the apparatus 900 may be comprised in any of the wireless communication devices 191, 192, 193, 407, 408, 409, 507 described in connection with FIGS. 1, 4 and 5 and/or the apparatus 900 may be configured to perform method steps of any of the methods described in connection with FIGS. 3, 4 and 5. The apparatus comprises controlling circuitry (CNTR; e.g. a controller or a control unit) 910.

The controlling circuitry is configured to cause acquisition of grouping information indicative of, for each of the two or more communication elements, which of the least two groups the wireless communication device is partitioned to (compare with step 310 of FIG. 3). To this end, the controlling circuitry may comprise, or be otherwise associated with (e.g., connectable, or connected, to) acquiring circuitry (ACQ; e.g., an acquirer or an acquisition unit) 911. The acquiring circuitry may be configured to acquire grouping information indicative of, for each of the two or more communication elements, which of the least two groups the wireless communication device is partitioned to (compare with step 310 of FIG. 3).

The controlling circuitry is further configured to cause determination of transmission and/or reception beam-forming parameters based on the grouping information (compare with step 320 of FIG. 3). To this end, the controlling circuitry may comprise, or be otherwise associated with (e.g., connectable, or connected, to) determining circuitry (DET; e.g., a determiner or a determination unit) 913. The determining circuitry may be configured to determine transmission and/or reception beam-forming parameters based on the grouping information (compare with step 320 of FIG. 3). The determining circuitry 913 may, for example, be beam-forming circuitry.

The controlling circuitry is further configured to cause use of the determined reception beam-forming parameters for reception and/or transmission (compare with step 330 of FIG. 3). To this end, the controlling circuitry may comprise, or be otherwise associated with (e.g., connectable, or connected, to) receiving and/or transmitting circuitry (TX/RX; e.g., a transceiver or a transceiver unit) 920. The transceiving circuitry may be configured to use the determined reception beam-forming parameters for reception and/or transmission (compare with step 330 of FIG. 3).

Figure 10:
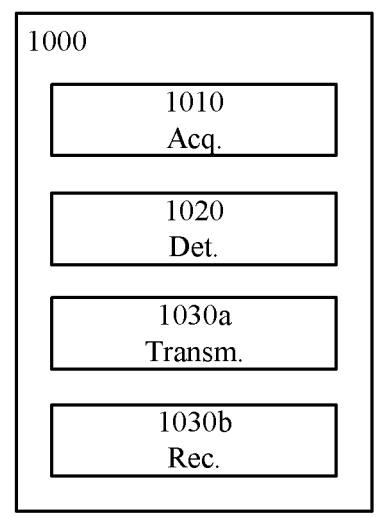
FIG. 10 is a schematic block diagram illustrating an example arrangement according to some embodiments.

FIG. 10 schematically illustrate an example arrangement 1000 according to some embodiments. The example apparatus is a disturbance mitigation apparatus for a wireless communication device configured to be served by two or more communication elements of a distributed antenna system, wherein each communication element is configured to be associated with two or more antenna elements of the distributed antenna system. Thus, the apparatus 900 may be comprised in any of the wireless communication devices 191, 192, 193, 407, 408, 409, 507 described in connection with FIGS. 1, 4 and 5 and/or the apparatus 900 may be configured to perform method steps of any of the methods described in connection with FIGS. 3, 4 and 5.

The arrangement 1000 comprises an acquisition unit (Acq.) 1010 configured to acquire grouping information indicative of, for each of the two or more communication elements, which of the least two groups the wireless communication device is partitioned to (compare with step 310 of FIG. 3).

The arrangement 1000 further comprises a determination unit (Det.) 1020 configured to determine transmission and/or reception beam-forming parameters based on the grouping information (compare with step 320 of FIG. 3).

The arrangement also comprises a transmission unit (Transm.) 1030a and a reception unit (Rec.) 1030b configured to use the determined reception beam-forming parameters for reception and/or transmission (compare with step 330 of FIG. 3).

Examples disclosed herein describes partition into a primary group for interference suppression and a secondary group for channel gain compensation. It is emphasized that this is not intended as limiting but merely as illustrative.

Other variants include application of more than one primary group, wherein different interference suppression techniques are applied for the different primary groups. Additionally or alternatively, application of more than one secondary group may be considered, wherein different channel gain compensation techniques are applied for the different secondary groups.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a communication element (e.g., an access point) for a distributed antenna system.

Embodiments may appear within an electronic apparatus (such as a wireless communication device or a communication element for a distributed antenna system) comprising arrangements, circuitry, and/or logic according to any of the embodiments described herein. Alternatively or additionally, an electronic apparatus (such as a wireless communication device or a communication element for a distributed antenna system) may be configured to perform methods according to any of the embodiments described herein.

Figure 11:
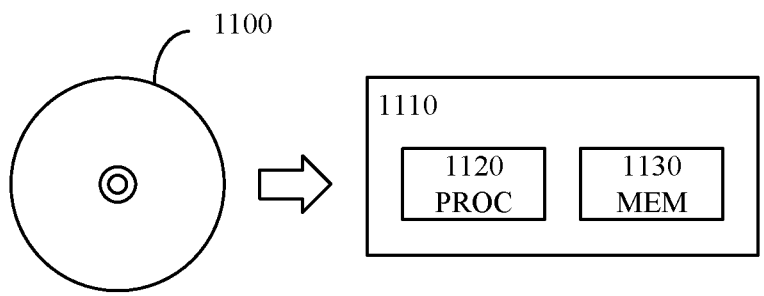
FIG. 11 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 11 illustrates an example computer readable medium in the form of a compact disc (CD) ROM 1100. The computer readable medium has stored thereon a computer program comprising program instructions. The computer program is loadable into a data processor (PROC) 1120, which may, for example, be comprised in a wireless communication device or a communication element for a distributed antenna system 1110. When loaded into the data processing unit, the computer program may be stored in a memory (MEM) 1130 associated with or comprised in the data-processing unit. According to some embodiments, the computer program may, when loaded into and run by the data processing unit, cause execution of method steps according to, for example, any of the methods illustrated in FIGS. 2-5 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

List of Example Items

1. A disturbance mitigation method of a communication element for a distributed antenna system, wherein the communication element is associated with two or more antenna elements of the distributed antenna system, the method comprising:
   acquiring channel condition information associated with at least two of a plurality of wireless communication devices served by the communication element;
   partitioning the plurality of wireless communication devices into at least two groups based on the acquired channel condition information;
   for each of the groups, determining respective pre-coding weights based on the acquired channel condition information, wherein the respective pre-coding weights of different groups are determined according to different disturbance mitigation approaches; and
   transmitting a signal comprising respective symbols intended for corresponding ones of the plurality of wireless communication devices, wherein the symbols intended for wireless communication devices of each group are pre-coded using the determined respective pre-coding weights of the group, and wherein the pre-coded symbols of at least two of the groups are super-positioned to form the signal.

2. The method of item 1, wherein there is a respective channel between each of the at least two wireless communication devices and each of the two or more antenna elements, and wherein acquiring channel condition information comprises:
   receiving uplink pilot signals transmitted by the at least two wireless communication devices; and
   determining, for each of the respective channels, a channel estimate based on measurements performed on the uplink pilot signals.

3. The method of item 1, wherein each of the at least two wireless communication devices belong to a set of wireless communication devices assigned a same uplink pilot signal, wherein there is a composite channel between each set of wireless communication devices and each of the two or more antenna elements, and wherein acquiring channel condition information comprises:
   receiving uplink pilot signals transmitted by the at least two wireless communication devices; and
   determining, for each of the composite channels, a channel estimate based on measurements performed on the uplink pilot signals.

4. The method of item 3, wherein partitioning the plurality of wireless communication devices into at least two groups comprises partitioning wireless communication devices assigned the same uplink pilot signal to a same group.

5. The method of any of items 1 through 4, wherein partitioning the plurality of wireless communication devices into at least two groups comprises partitioning a first wireless communication device to a first group when an associated signal strength of the first wireless communication device is higher than respective associated signal strengths of wireless communication devices of other groups.

6. The method of any of items 1 through 5, wherein the disturbance mitigation approach for determining the respective pre-coding weights for a primary one of the groups is an interference suppression approach.

7. The method of any of items 1 through 6, wherein the disturbance mitigation approach for determining the respective pre-coding weights for a secondary one of the groups is a channel gain compensation approach.

8. The method of any of items 1 through 7, wherein a particular wireless communication device is served by the communication element and by at least one further communication element of the distributed antenna system, and wherein the determined pre-coding weights of the group of the particular wireless communication device are configured to cause constructive combination, at the particular wireless communication device, of the symbols intended for the particular wireless communication device.

9. A disturbance mitigation method of a wireless communication device served by two or more communication elements of a distributed antenna system, wherein each of the communication elements is associated with two or more antenna elements of the distributed antenna system, and wherein each of the communication elements is configured to partition the wireless communication device to a respective one of at least two groups, the method comprising:
   acquiring grouping information indicative of, for each of the two or more communication elements, which of the least two groups the wireless communication device is partitioned to; and
   determining transmission and/or reception beam-forming parameters based on the grouping information.

10. The method of item 9, further comprising using the determined reception beam-forming parameters to receive a signal comprising symbols intended for the wireless communication device and symbols intended for one or more other wireless communication devices, wherein the symbols are pre-coded using respective group pre-coding weights, wherein the respective pre-coding weights of different groups are according to different disturbance mitigation approaches, and wherein the pre-coded symbols of at least two of the groups are super-positioned to form the signal.

11. The method of any of items 9 through 10, further comprising using the determined transmission beam-forming parameters to transmit uplink pilot signals for channel estimation.

12. A computer program product comprising a non-transitory computer readable medium, having thereon a computer program comprising program instructions, the computer program being loadable into a data processing unit and configured to cause execution of the method according to any of items 1 through 11 when the computer program is run by the data processing unit.

13. A disturbance mitigation apparatus for a communication element for a distributed antenna system, wherein the communication element is configured to be associated with two or more antenna elements of the distributed antenna system, the apparatus comprising controlling circuitry configured to cause:
   acquisition of channel condition information associated with at least two of a plurality of wireless communication devices served by the communication element;
   partitioning of the plurality of wireless communication devices into at least two groups based on the acquired channel condition information;
   for each of the groups, determination of respective pre-coding weights based on the acquired channel condition information, wherein the respective pre-coding weights of different groups are determined according to different disturbance mitigation approaches; and
   transmission of a signal comprising respective symbols intended for corresponding ones of the plurality of wireless communication devices, wherein the symbols intended for wireless communication devices of each group are pre-coded using the determined respective pre-coding weights of the group, and wherein the pre-coded symbols of at least two of the groups are super-positioned to form the signal.

14. The apparatus of item 13, wherein—when there is a respective channel between each of the at least two wireless communication devices and each of the two or more antenna elements—the controlling circuitry is configured to cause the acquisition of channel condition information by causing:
   reception of uplink pilot signals transmitted by the at least two wireless communication devices; and
   determination, for each respective channel, of a channel estimate based on measurements performed on the uplink pilot signals.

15. The apparatus of item 13, wherein—when each of the at least two wireless communication devices belong to a set of wireless communication devices assigned a same uplink pilot signal, and when there is a composite channel between each set of wireless communication devices and each of the two or more antenna elements—the controlling circuitry is configured to cause the acquisition of channel condition information by causing:
   reception of uplink pilot signals transmitted by the at least two wireless communication devices; and
   determination, for each composite channel, of a channel estimate based on measurements performed on the uplink pilot signals.

16. The apparatus of item 15, wherein the controlling circuitry is configured to cause the partitioning of the plurality of wireless communication devices into at least two groups by causing partitioning of wireless communication devices assigned the same uplink pilot signal to a same group.

17. The apparatus of any of items 13 through 16, wherein the controlling circuitry is configured to cause the partitioning of the plurality of wireless communication devices into at least two groups by causing partitioning of a first wireless communication device to a first group when an associated signal strength of the first wireless communication device is higher than respective associated signal strengths of wireless communication devices of other groups.

18. The apparatus of any of items 13 through 17, wherein the disturbance mitigation approach for determining the respective pre-coding weights for a primary one of the groups is an interference suppression approach.

19. The apparatus of any of items 13 through 18, wherein the disturbance mitigation approach for determining the respective pre-coding weights for a secondary one of the groups is a channel gain compensation approach.

20. The apparatus of any of items 13 through 19, wherein—
when a particular wireless communication device is served by the communication element and by at least one further communication element of the distributed antenna system—the determined pre-coding weights of the group of the particular wireless communication device are configured to cause constructive combination, at the particular wireless communication device, of the symbols intended for the particular wireless communication device.

21. A disturbance mitigation apparatus for a communication element for a distributed antenna system, wherein the communication element is configured to be associated with two or more antenna elements of the distributed antenna system, the apparatus comprising:
an acquisition unit configured to acquire channel condition information associated with at least two of a plurality of wireless communication devices served by the communication element;
a partition unit configured to partition the plurality of wireless communication devices into at least two groups based on the acquired channel condition information;
a determination unit configured to, for each of the groups, determine respective pre-coding weights based on the acquired channel condition information, wherein the respective pre-coding weights of different groups are determined according to different disturbance mitigation approaches; and
a transmission unit configured to transmit a signal comprising respective symbols intended for corresponding ones of the plurality of wireless communication devices, wherein the symbols intended for wireless communication devices of each group are pre-coded using the determined respective pre-coding weights of the group, and wherein the pre-coded symbols of at least two of the groups are super-positioned to form the signal.

22. A communication element for a distributed antenna system, wherein the communication element is configured to be associated with two or more antenna elements of the distributed antenna system, the communication element comprising the apparatus of any of items 13 through 21.

23. The communication element of item 22 further comprising the two or more antennas.

24. A distributed antenna system comprising a plurality of communication elements according to any of items 22 through 23, each associated with two or more antenna elements.

25. The distributed antenna system of item 24, wherein the plurality of communication elements are comprised in an antenna arrangement body having flexible structure and elongated shape.

26. A disturbance mitigation apparatus for a wireless communication device configured to be served by two or more communication elements of a distributed antenna system, wherein each of the communication elements is configured to be associated with two or more antenna elements of the distributed antenna system, and wherein each of the communication elements is configured to partition the wireless communication device to a respective one of at least two groups, the apparatus comprising controlling circuitry configured to cause:
acquisition of grouping information indicative of, for each of the two or more communication elements, which of the least two groups the wireless communication device is partitioned to; and
determination of transmission and/or reception beam-forming parameters based on the grouping information.

27. The apparatus of item 26, wherein the controlling circuitry is further configured to cause use of the determined reception beam-forming parameters for reception of a signal comprising symbols intended for the wireless communication device and symbols intended for one or more other wireless communication devices, wherein the symbols are pre-coded using respective group pre-coding weights, wherein the respective pre-coding weights of different groups are according to different disturbance mitigation approaches, and wherein the pre-coded symbols of at least two of the groups are super-positioned to form the signal.

28. The apparatus of any of items 26 through 27, wherein the controlling circuitry is further configured to cause use of the determined transmission beam-forming parameters for transmission of uplink pilot signals for channel estimation.

29. A disturbance mitigation apparatus for a wireless communication device configured to be served by two or more communication elements of a distributed antenna system, wherein each of the communication elements is configured to be associated with two or more antenna elements of the distributed antenna system, and wherein each of the communication elements is configured to partition the wireless communication device to a respective one of at least two groups, the apparatus comprising:
an acquisition unit configured to acquire grouping information indicative of, for each of the two or more communication elements, which of the least two groups the wireless communication device is partitioned to; and
a determination unit configured to determine transmission and/or reception beam-forming parameters based on the grouping information.

30. A wireless communication device comprising the apparatus of any of items 26 through 29.

The invention claimed is:

1. A disturbance mitigation method of a communication element for a distributed antenna system, wherein the communication element is associated with two or more antenna elements of the distributed antenna system, the method comprising:
acquiring channel condition information associated with at least two of a plurality of wireless communication devices served by the communication element, the channel condition information comprising at least one of (a) signal strength estimates and (b) channel response estimates;
partitioning the plurality of wireless communication devices into at least two groups based on the acquired channel condition information;
for each of the groups, determining respective pre-coding weights based on the acquired channel condition information, wherein the respective pre-coding weights of different groups are determined according to different disturbance mitigation approaches; and
transmitting a signal comprising respective symbols intended for corresponding ones of the plurality of wireless communication devices, wherein the symbols intended for wireless communication devices of each group are pre-coded using the determined respective pre-coding weights of the group, and wherein the pre-coded symbols of at least two of the groups are super-positioned to form the signal.

2. The method of claim 1, wherein there is a respective channel between each of the at least two wireless communication devices and each of the two or more antenna elements, and wherein acquiring channel condition information comprises:
- receiving uplink pilot signals transmitted by the at least two wireless communication devices; and
- determining, for each of the respective channels, a channel response estimate based on measurements performed on the uplink pilot signals.

3. The method of claim 1, wherein each of the at least two wireless communication devices belongs to a set of wireless communication devices assigned a same uplink pilot signal, wherein there is a composite channel between each set of wireless communication devices and each of the two or more antenna elements, and wherein acquiring channel condition information comprises:
- receiving uplink pilot signals transmitted by the at least two wireless communication devices; and
- determining, for each of the composite channels, a channel response estimate based on measurements performed on the uplink pilot signals.

4. The method of claim 3, wherein partitioning the plurality of wireless communication devices into at least two groups comprises partitioning wireless communication devices assigned the same uplink pilot signal to a same group.

5. The method of claim 1, wherein partitioning the plurality of wireless communication devices into at least two groups comprises partitioning a first wireless communication device to a first group when an associated signal strength of the first wireless communication device is higher than respective associated signal strengths of wireless communication devices of other groups.

6. The method of claim 1, wherein the disturbance mitigation approach for determining the respective pre-coding weights for a first one of the groups is an interference suppression approach or and the disturbance mitigation approach for determining the respective pre-coding weights for a second one of the groups is a channel gain compensation approach.

7. The method of claim 1, wherein a particular wireless communication device is served by the communication element and by at least one further communication element of the distributed antenna system, and wherein the determined pre-coding weights of the group of the particular wireless communication device are configured to cause constructive combination, at the particular wireless communication device, of the symbols intended for the particular wireless communication device.

8. A disturbance mitigation method of a wireless communication device served by two or more communication elements of a distributed antenna system, wherein each of the communication elements is associated with two or more antenna elements of the distributed antenna system, and wherein each of the communication elements is configured to partition the wireless communication device to a respective one of at least two groups, the method comprising:
- acquiring grouping information indicative of, for each of the two or more communication elements, which of the at least two groups the wireless communication device is partitioned to; and
- determining transmission and/or reception beam-forming parameters based on the grouping information.

9. The method of claim 8, further comprising using the determined reception beam-forming parameters to receive a signal comprising symbols intended for the wireless communication device and symbols intended for one or more other wireless communication devices, wherein the symbols are pre-coded using respective group pre-coding weights, wherein the respective pre-coding weights of different groups are according to different disturbance mitigation approaches, and wherein the pre-coded symbols of at least two of the groups are super-positioned to form the signal.

10. The method of claim 8, further comprising using the determined transmission beam-forming parameters to transmit uplink pilot signals for channel estimation.

11. A disturbance mitigation apparatus for a communication element for a distributed antenna system, wherein the communication element is configured to be associated with two or more antenna elements of the distributed antenna system, the apparatus comprising controlling circuitry configured to cause:
- acquisition of channel condition information associated with at least two of a plurality of wireless communication devices served by the communication element, the channel condition information comprising at least one of (a) signal strength estimates and (b) channel response estimates;
- partitioning of the plurality of wireless communication devices into at least two groups based on the acquired channel condition information;
- for each of the groups, determination of respective pre-coding weights based on the acquired channel condition information, wherein the respective pre-coding weights of different groups are determined according to different disturbance mitigation approaches; and
- transmission of a signal comprising respective symbols intended for corresponding ones of the plurality of wireless communication devices, wherein the symbols intended for wireless communication devices of each group are pre-coded using the determined respective pre-coding weights of the group, and wherein the pre-coded symbols of at least two of the groups are super-positioned to form the signal.

12. The apparatus of claim 11, wherein the controlling circuitry is configured to cause, when there is a respective channel between each of the at least two wireless communication devices and each of the two or more antenna elements, the acquisition of channel condition information by causing:
- reception of uplink pilot signals transmitted by the at least two wireless communication devices; and
- determination, for each respective channel, of a channel response estimate based on measurements performed on the uplink pilot signals.

13. A communication element for a distributed antenna system, wherein the communication element is configured to be associated with two or more antenna elements of the distributed antenna system, the communication element comprising the apparatus of claim 12.

14. The communication element of claim 13, further comprising the two or more antennas.

15. A distributed antenna system comprising a plurality of communication elements according to claim 13, further comprising, for each of the plurality of communication elements, two or more associated antenna elements.

16. The distributed antenna system of claim 15, wherein the plurality of communication elements are comprised in an antenna arrangement body having flexible structure and elongated shape.

17. The apparatus of claim 11, wherein the controlling circuitry is configured to cause, when each of the at least two wireless communication devices belong to a set of wireless communication devices assigned a same uplink pilot signal and when there is a composite channel between each set of wireless communication devices and each of the two or more antenna elements, the acquisition of channel condition information by causing:

reception of uplink pilot signals transmitted by the at least two wireless communication devices; and determination, for each composite channel, of a channel response estimate based on measurements performed on the uplink pilot signals.

18. The apparatus of claim 17, wherein the controlling circuitry is configured to cause the partitioning of the plurality of wireless communication devices into at least two groups by causing partitioning of wireless communication devices assigned the same uplink pilot signal to a same group.

19. The apparatus of claim 11, wherein the controlling circuitry is configured to cause the partitioning of the plurality of wireless communication devices into at least two groups by causing partitioning of a first wireless communication device to a first group when an associated signal strength of the first wireless communication device is higher than respective associated signal strengths of wireless communication devices of other groups.

20. The apparatus of claim 11, wherein the disturbance mitigation approach for determining the respective pre-coding weights for a primary one of the groups is an interference suppression approach.

21. The apparatus of claim 20, wherein the disturbance mitigation approach for determining the respective pre-coding weights for a secondary one of the groups is a channel gain compensation approach.

22. The apparatus of claim 11, wherein the determined pre-coding weights of the group of the particular wireless communication device are configured to cause, when a particular wireless communication device is served by the communication element and by at least one further communication element of the distributed antenna system, constructive combination at the particular wireless communication device of the symbols intended for the particular wireless communication device.

23. A disturbance mitigation apparatus for a wireless communication device configured to be served by two or more communication elements of a distributed antenna system, wherein each of the communication elements is configured to be associated with two or more antenna elements of the distributed antenna system, and wherein each of the communication elements is configured to partition the wireless communication device to a respective one of at least two groups, the apparatus comprising controlling circuitry configured to cause:

acquisition of grouping information indicative of, for each of the two or more communication elements, which of the at least two groups the wireless communication device is partitioned to; and determination of transmission and/or reception beam-forming parameters based on the grouping information.

24. The apparatus of claim 23, wherein the controlling circuitry is further configured to cause use of the determined reception beam-forming parameters for reception of a signal comprising symbols intended for the wireless communication device and symbols intended for one or more other wireless communication devices, wherein the symbols are pre-coded using respective group pre-coding weights, wherein the respective pre-coding weights of different groups are according to different disturbance mitigation approaches, and wherein the pre-coded symbols of at least two of the groups are super-positioned to form the signal.

25. The apparatus of claim 23, wherein the controlling circuitry is further configured to cause use of the determined transmission beam-forming parameters for transmission of uplink pilot signals for channel estimation.

26. A wireless communication device comprising the apparatus of claim 23.

* * * * *